Nov. 7, 1950 M. BRUSTOWSKY 2,528,853
MULTIPLE RECIPROCATING BLADE BREAD SLICING MACHINE
Filed May 26, 1945 10 Sheets-Sheet 1
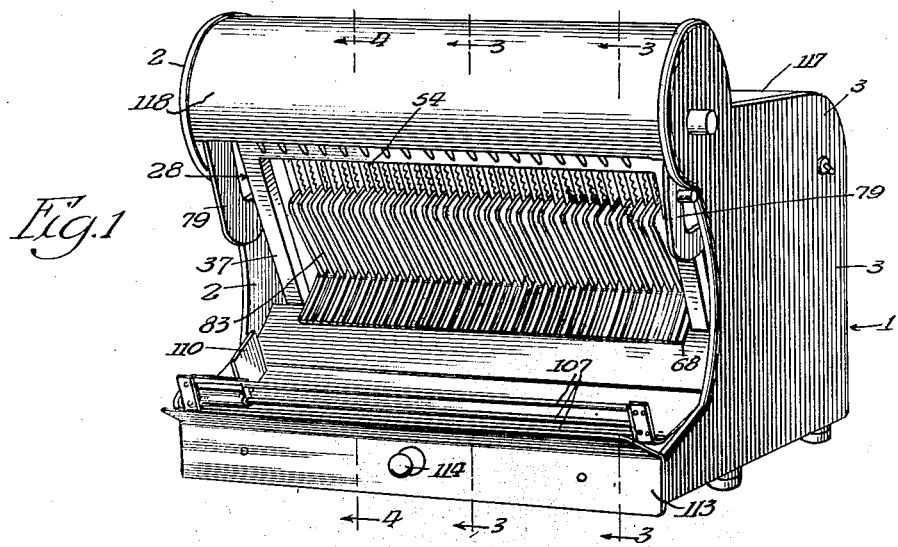
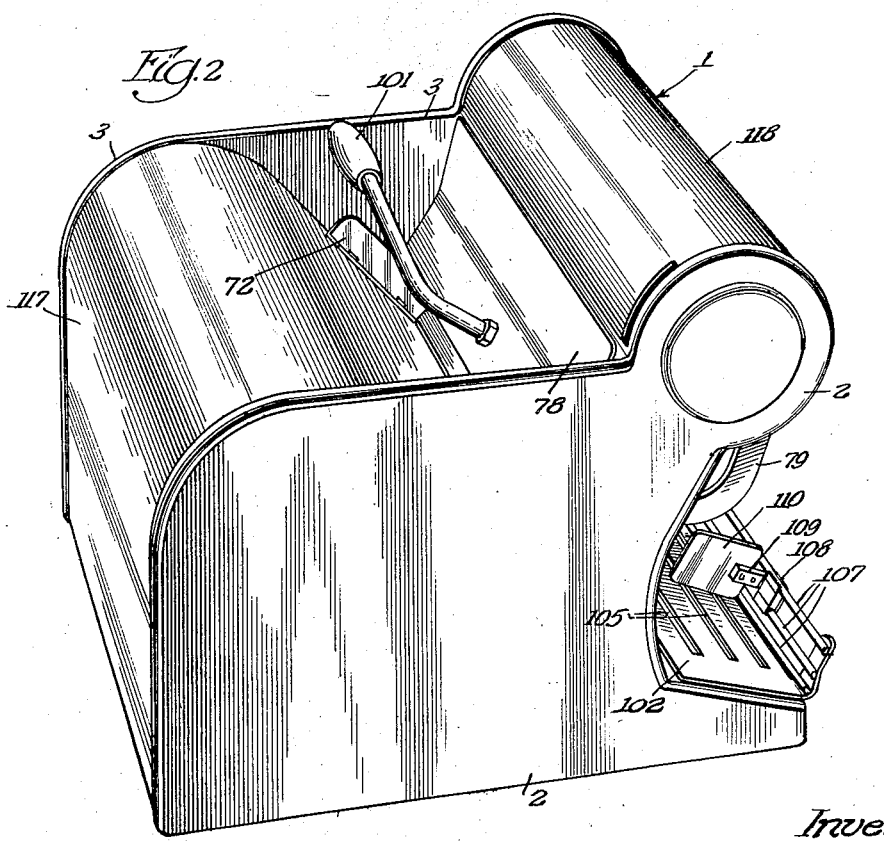
Inventor
Morris Brustowsky
By Spencer, Marzall, Johnston & Cook
Attys.

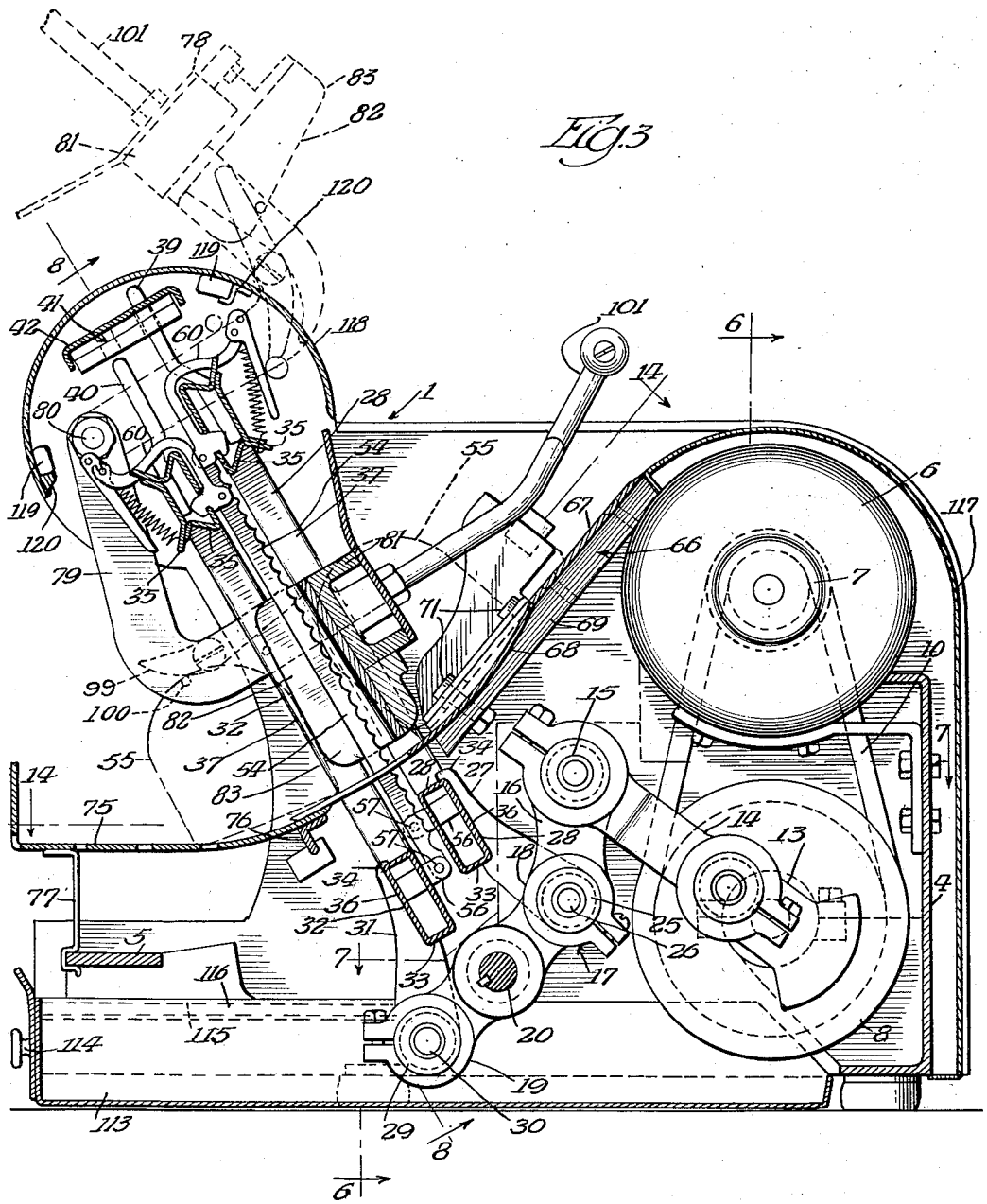

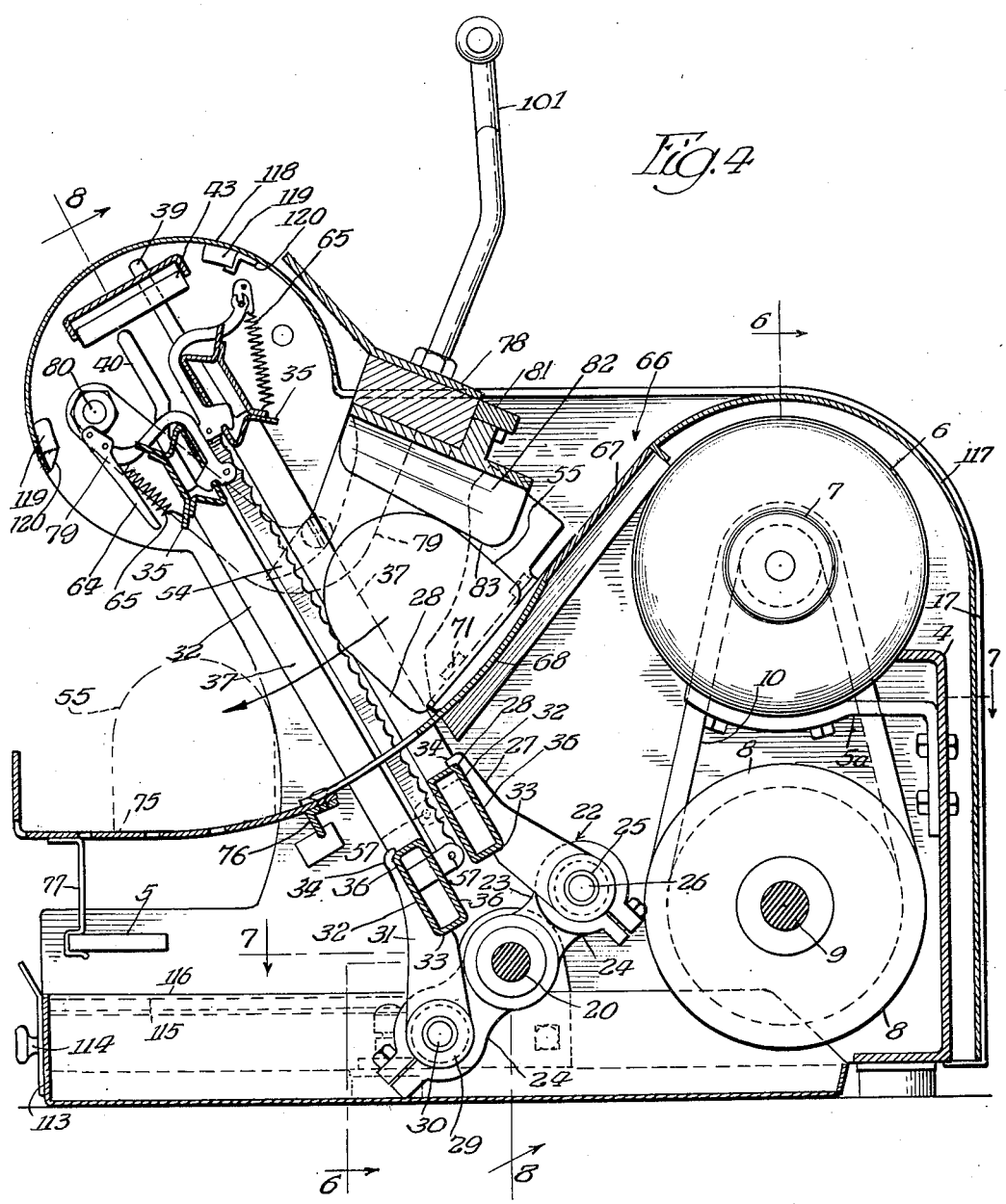

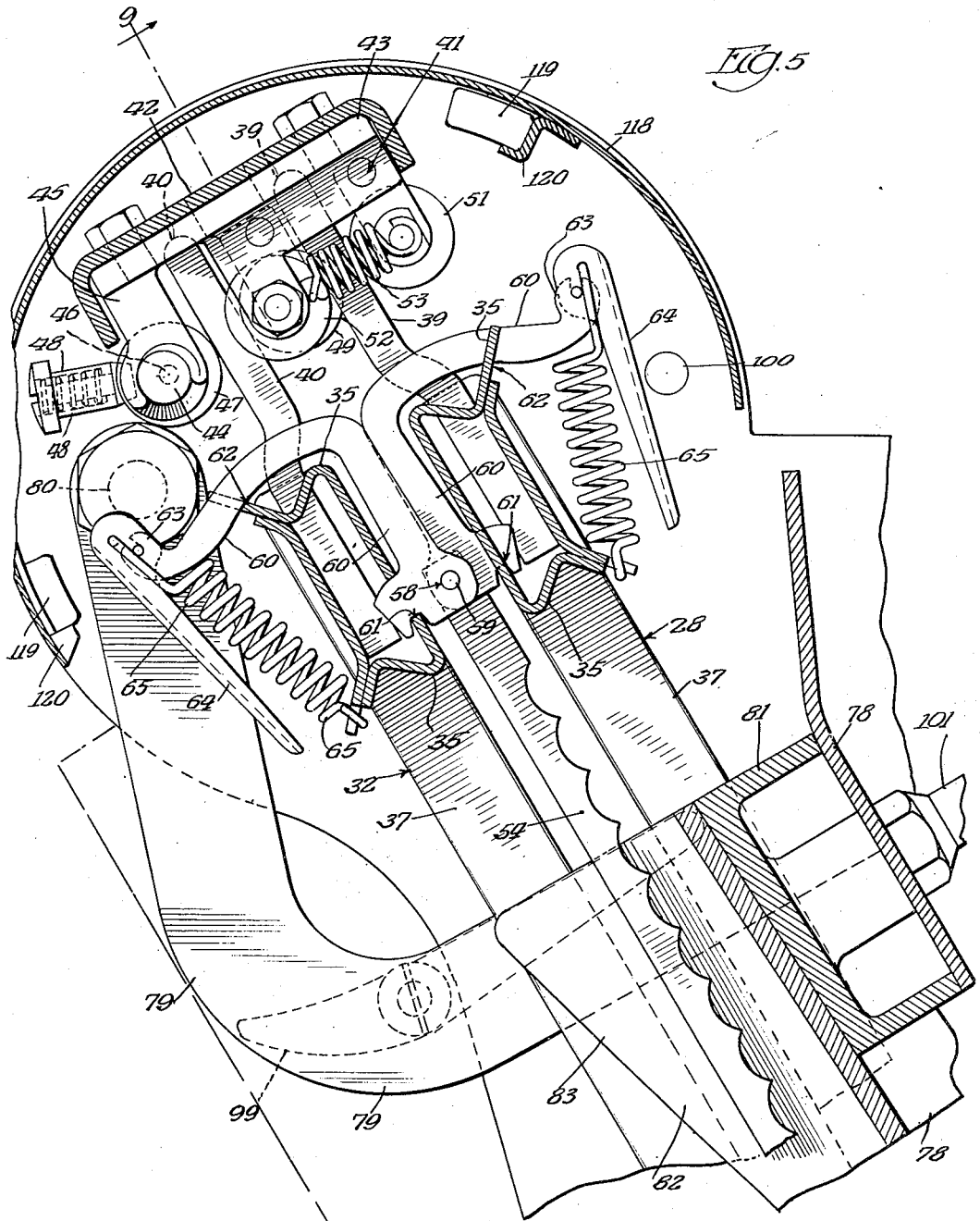

Nov. 7, 1950  M. BRUSTOWSKY  2,528,853
MULTIPLE RECIPROCATING BLADE BREAD SLICING MACHINE
Filed May 26, 1945  10 Sheets-Sheet 5

Inventor
Morris Brustowsky
By Spencer, Marzall, Johnston & Cook, attys

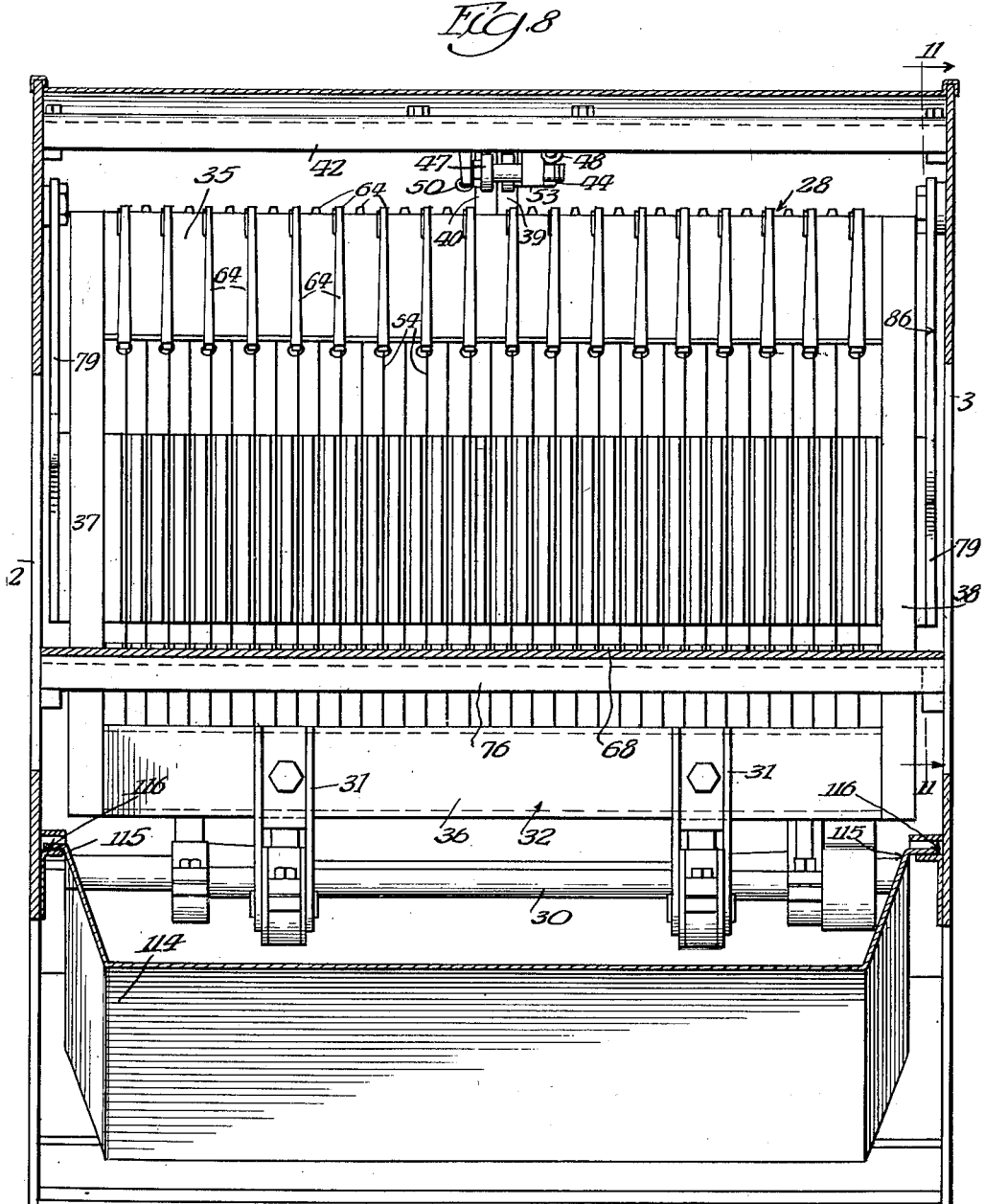

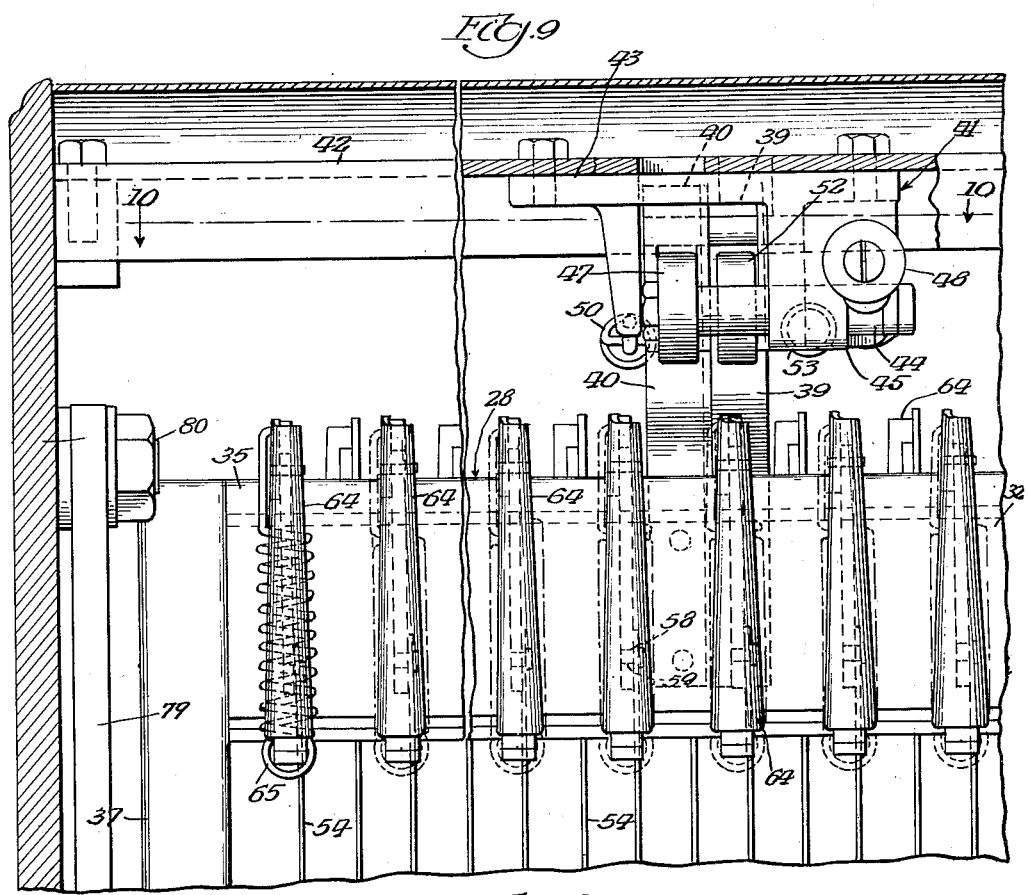
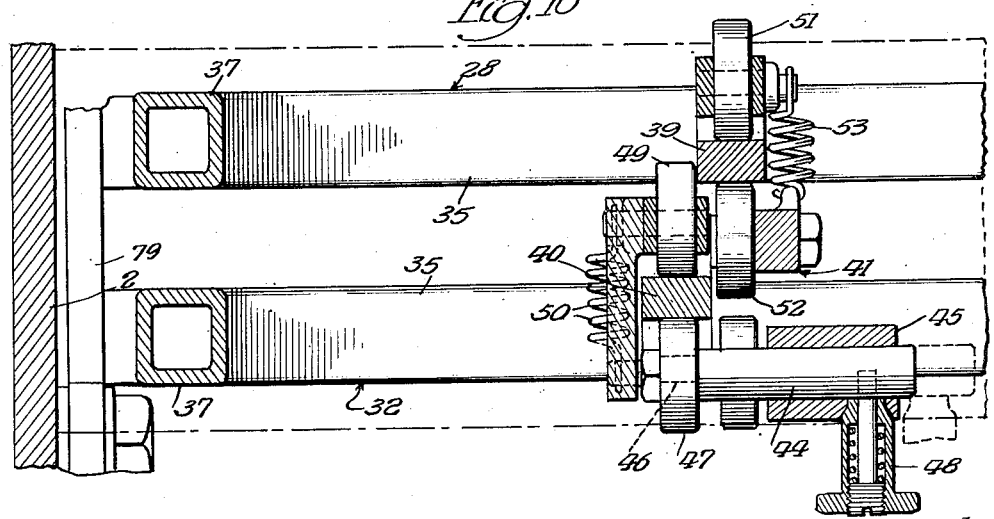

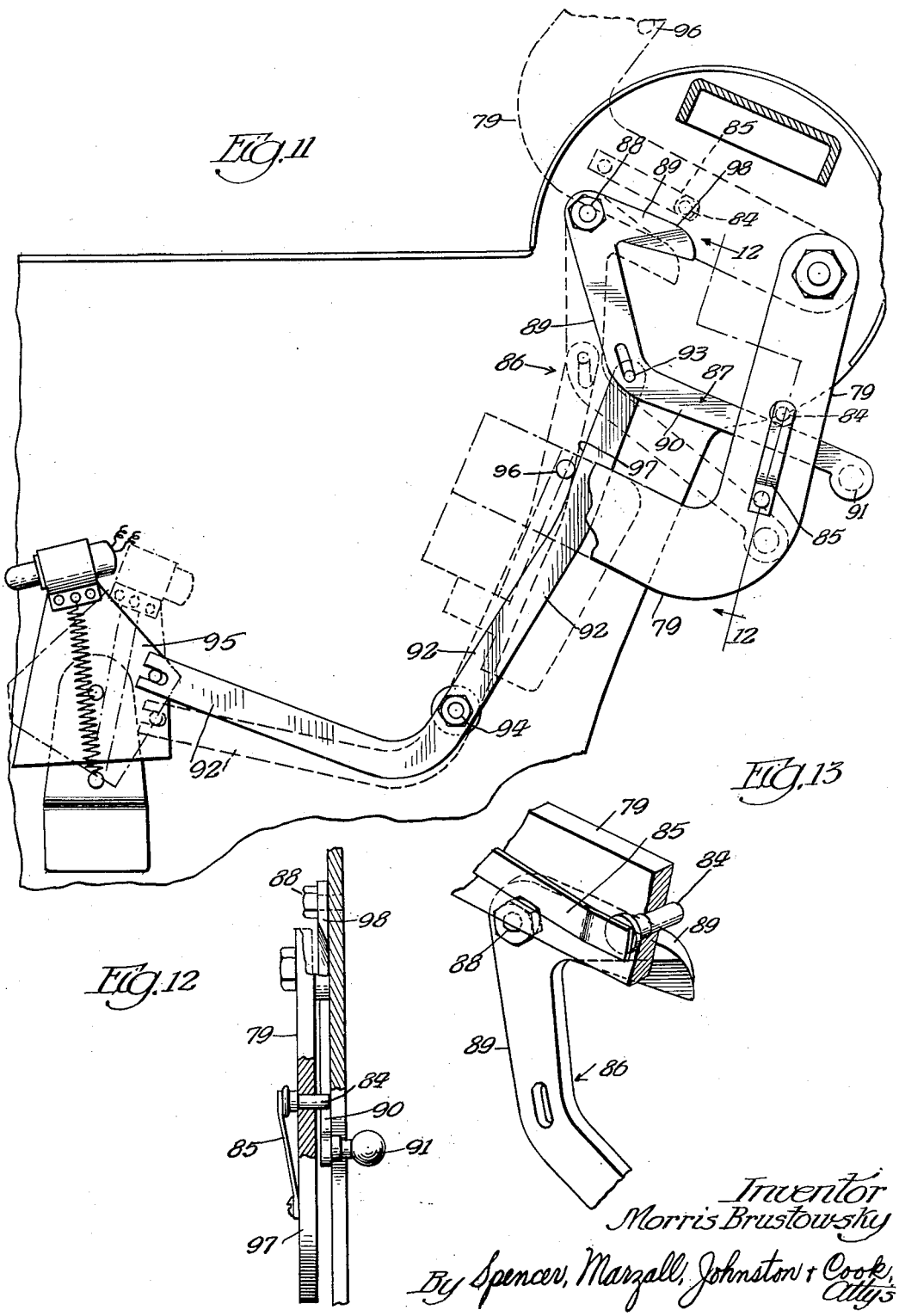

Nov. 7, 1950     M. BRUSTOWSKY     2,528,853
MULTIPLE RECIPROCATING BLADE BREAD SLICING MACHINE
Filed May 26, 1945     10 Sheets-Sheet 9
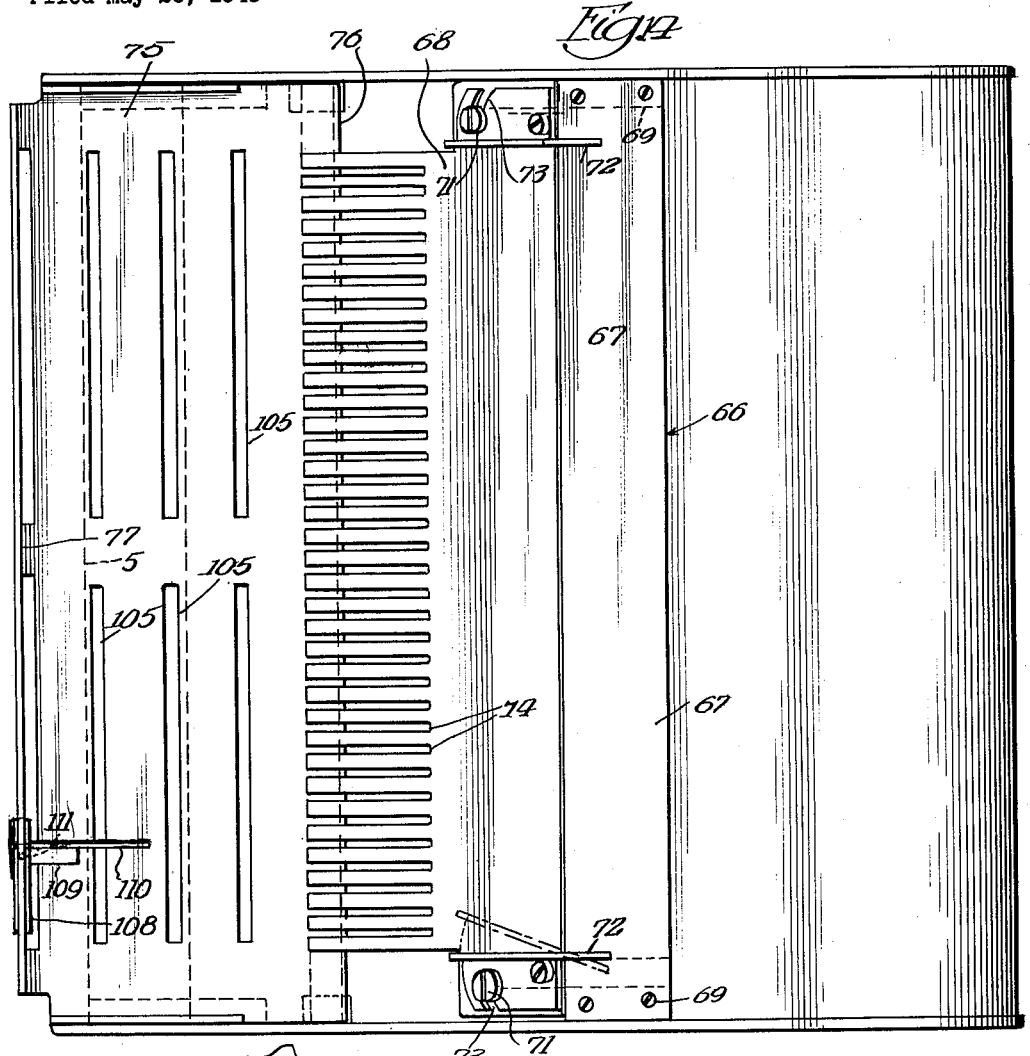
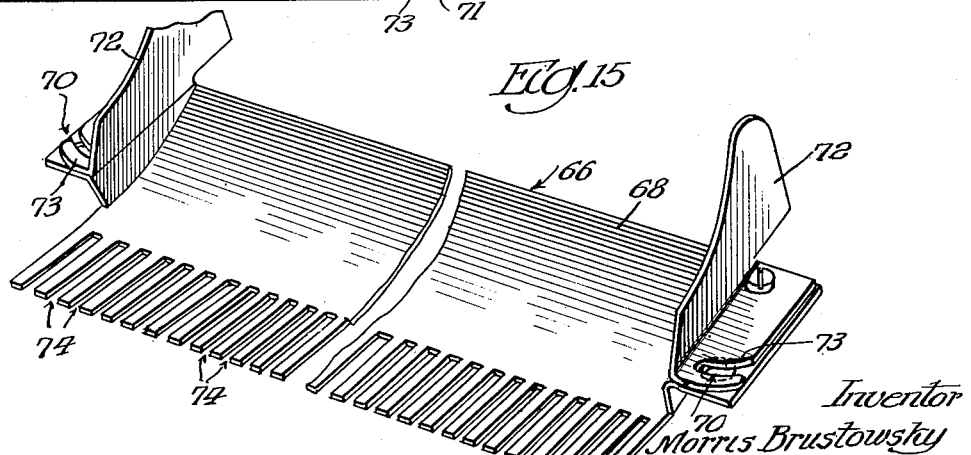
Inventor
Morris Brustowsky
By Spencer Marzall, Johnston & Cook, atty.

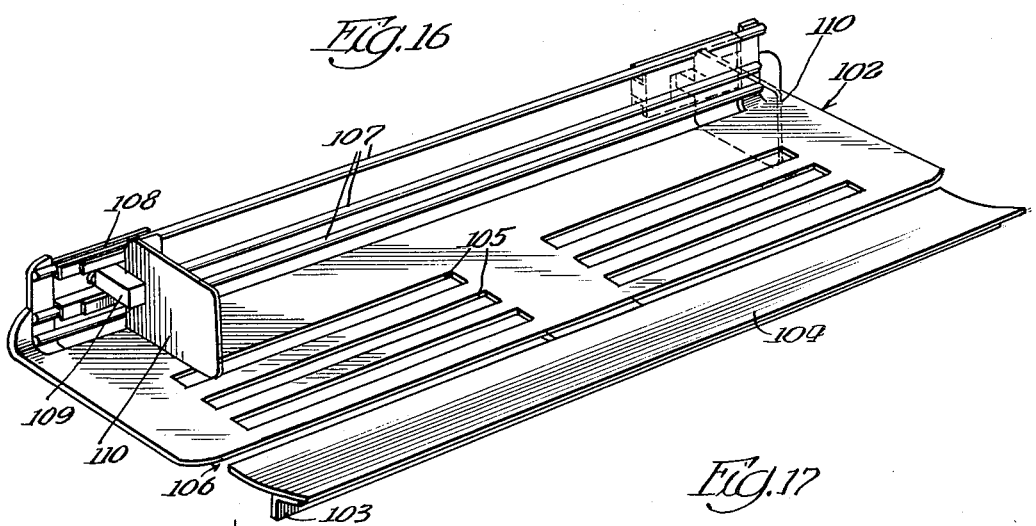
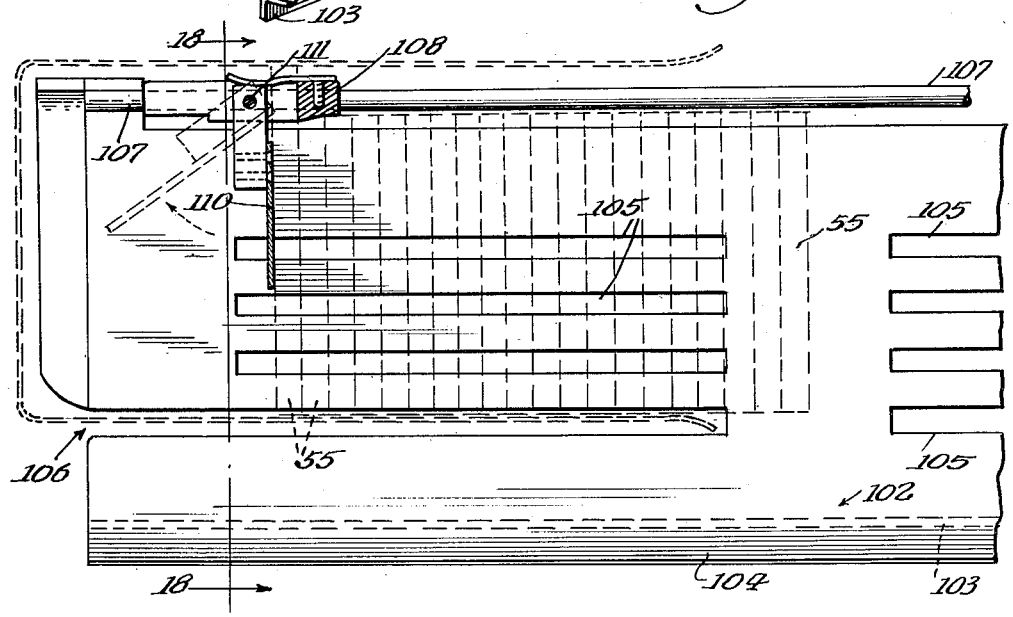

Patented Nov. 7, 1950

2,528,853

UNITED STATES PATENT OFFICE 2,528,853

MULTIPLE RECIPROCATING BLADE BREAD SLICING MACHINE

Morris Brustowsky, Brooklyn, N. Y., assignor to U. S. Slicing Machine Company, Inc., a corporation of Indiana Application May 26, 1945, Serial No. 596,009

10 Claims. (Cl. 146—152)

This invention relates to a slicing machine in general and particularly to a slicing machine for slicing loaves of bread.

An important object of the invention is to provide a new and improved slicing machine embodying a specific construction of elements whereby the machine may be dismantled for cleaning purposes, repair and the like, without the use of tools, the parts being interfitting and interengaging to permit quick and easy assembly and to prevent rattling .

Another important object of the invention is the provision of a slicing machine of improved construction for feeding the bread horizontally to the cutting blades at an angle to permit the blades to bite easily into a loaf at a corner of the loaf and then feeding the loaf through the vertical cutting knives to assure the cut slices being moved away from the vertically reciprocating knife frames, the loaf after being cut standing flat on its bottom so as to prevent the slices from shifting.

Another object of the invention is the provision of new and improved means for preventing the machine from starting until the pusher has moved to a position to prevent the operator's hand from getting into the operating space and near the knives, there being means to effect automatic shut-off of the machine when the bread is sliced; also novel means are provided for effecting the starting and stopping of the machine.

A further object of the invention is the provision of new and novel driving means properly counterbalanced so as to eliminate vibration to a great extent.

A further object is to provide a bread cutting machine in which a pusher acts as a hold-down member for the loaf, the machine being so constructed that the knives will not commence operating until the top of the pusher is substantially parallel with the top of the machine frame, thereupon leaving no room for the operator's hand and thereby providing safety to the operator.

A still further object of the invention resides in the provision of new and improved means for supporting and guiding the reciprocating knife frames, there being novel means for releasing one of the knife frames from its guide whereby easy access may be had to either of the frames.

Still another object of the invention resides in the provision of a machine of novel and simple construction whereby numerous complicated wearing parts are eliminated and certain of the parts are adapted to be removed without tools, and whereby the machine may be converted from a counter type of machine to a continuous feeding and slicing machine by the addition of feed and slice receiving conveyors.

Still another object of the invention resides in a slice receiving tray which is provided with a quick wrap bagging device whereby the cut slices may be inserted in a bag from either side, the slice pusher being adapted to be inserted on opposite sides for either right or left hand bagging.

Numerous other objects and advantages will be apparent throughout the progress of the following specification.

The accompanying drawings illustrate a selected embodiment of the invention and the views therein are as follows:

Fig. 1 is a detail perspective view showing the front and left sides of the machine looking from the operator's stance;

Fig. 2 is a detail perspective view of the rear and right sides of the machine looking from the operator's stance;

Fig. 3 is a detail vertical sectional view on the line 3—3 of Fig. 1;

Fig. 4 is a detail vertical sectional view on the lines 4—4 of Figs. 1 and 7;

Fig. 5 is a detail vertical sectional view similar to Fig. 3, but on an enlarged scale, and showing the knife frames in their neutral position;

Fig. 8 is a detail sectional view on the lines 8—8 of Figs. 3 and 4;

Fig. 9 is a detail vertical sectional view on the line 9—9 of Fig. 5;

Fig. 10 is a detail transverse sectional view on the line 10—10 of Fig. 9;

Fig. 11 is a detail vertical sectional view on the line 11—11 of Fig. 8;

Fig. 12 is a detail longitudinal sectional view on the line 12—12 of Fig. 11;

Fig. 13 is a detail fragmentary enlarged view of the upper end of some of the linkage mechanism for controlling the start-stop switch;

Fig. 14 is a transverse sectional view on the line 14—14 of Fig. 3;

Fig. 15 is a detail perspective view of part of the loaf supporting member or feeding chute;

Fig. 16 is a detail perspective view of a modified form of slice receiving tray having means for supporting a bag and shiftable means for pushing the cut slices into the bag;

Fig. 17 is a detail top plan view of the structure shown in Fig. 16, parts being broken away for the sake of clearness; and Fig. 18 is a transverse sectional view on the line 18—18 of Fig. 17.

Figure 6:
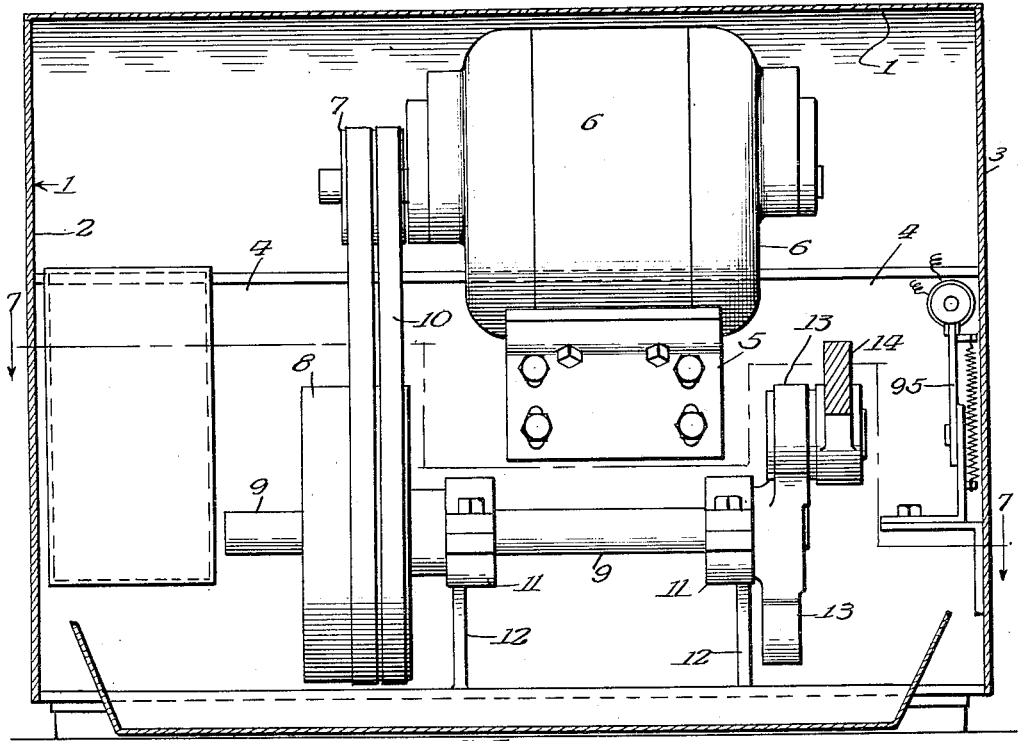
Fig. 6 is a detail vertical sectional view on the lines 6—6 of Figs. 3 and 4.

The particular bread slicing machine herein shown for the purpose of illustrating the invention comprises a frame 1 having spaced side walls 2 and 3 connected at one end by a plate 4 and by a spaced front tie rod or strap 5. A bracket 5a is mounted on the plate 4 and this bracket supports a motor 6. A motor pulley 7 on the shaft of the motor 6 drives a fly wheel pulley 8 mounted on a crankshaft 9, by means of a belt 10. The crankshaft 9 is supported in bearings 11, 11 on a bracket 12 which is also removably mounted on the inside of the plate 4, Figs. 1 to 4.

Figure 7:
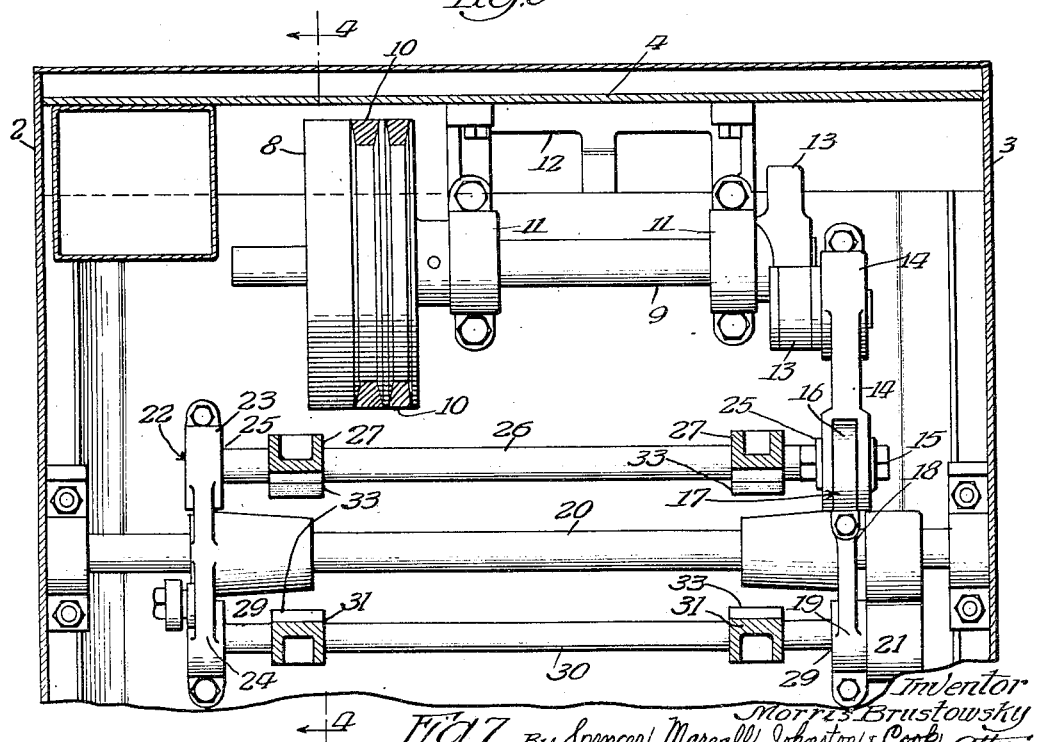
Fig. 7 is a detail plan section on the lines 7—7 of Figs. 3 and 6.

A weighted crank arm 13 is spaced from the fly wheel pulley 8, being secured to the end of the crankshaft 9 opposite the end to which the fly wheel pulley 8 is connected so as to provide for proper counterbalance. The crank arm 13 is connected to a drive link 14 which is pivotally connected at 15 to an extension 16 on a rocker 17. The rocker 17, which includes the rocker arms 18 and 19, is fixed to a rockshaft 20. This shaft 20 is supported in bearings on the side walls 2 and 3, Fig. 7. A counterweight 21 is fixed to the rockshaft 20 and to the outer arm 19 of the rocker to counterbalance the extension 16 on the rocker 17, Fig. 7.

A second rocker 22 (but without an extension) has rocker arms 23 and 24 corresponding to the rocker arms 18 and 19, respectively, of the rocker 17. This rocker is secured to the rockshaft 20 and is adapted to rock synchronously with the rocker 17. Bearings 25, 25 in the arms 18 and 23 of the rockers 17 and 22, respectively, revolubly support a shaft 26, Fig. 7, to which knife frame brackets 27, 27 are secured to support an inside knife frame 28. Bearings 29, 29 in the arms 19 and 24 of the rockers 17 and 22, respectively, revolubly support a shaft 30 to which knife frame brackets 31, 31 are secured to support a second knife frame 32. Each bracket, 27 and 31, is provided with a flat frame engaging surface 33 and a projecting end 34 for receiving respectively a side and bottom edge of a knife frame 28 or 32, Figs. 3 to 7.

The knife frames 28 and 32 are each preferably rectangular in form and include hollow multisided top and bottom bars 35 and 36, respectively, and hollow rectangularly shaped side bars 37 and 38. Each knife frame is supported on a pair of the brackets 27 or 31 and is fixed to the proper pair of brackets by means of bolts threadedly engaging threaded nut-like members formed interiorly of a knife frame bottom bar 36. Guide fingers or members 39 and 40 are fixed respectively to the top bars 35 of the frames 28 and 32, to permit proper reciprocation of the knife frames and properly guide the frames. These fingers 39 and 40 on the frames 28 and 32 cooperate with, and are guided by, a fixture or fitting 41 which is mounted on the underside of a tie or spacer bar 42 connecting opposite side walls 2 and 3 and the upper outer end thereof, Figs. 3, 4, 8 and 10.

The fixture 41, Figs. 5, 9 and 10, comprises a supporting plate 43 which is mounted on the tie and spacer bar 42, there being aligned openings in the fixture supporting plate 43 and the tie spacer bar 42 to permit the fingers 39 and 40, respectively, on the frames 28 and 32 to pass through during operating reciprocal movement of the frames 28 and 32. A front shaft 44 is revolubly and slidably mounted in a boss 45 formed on the plate 43. A roller supporting shaft 46 is eccentrically positioned on the shaft 44 and this shaft 46 carries a ball bearing roller 47. A spring urged locking handle 48 is fastened to the shaft 44 to turn the shaft 44 to eccentric shifted position to bring the roller 47 in proper spaced relationship with a cooperating roller 49. The handle 48 also cooperates with a keeper part formed in the boss 45 to lock the shaft 44 and the roller 47 in proper operable position whereby the roller 47 will be in fixed but revoluble position.

The rollers 47 and 49 are arranged on opposite sides of the aligned plate and bar openings through which the finger 40 on the front frame 32 passes. These rollers 47 and 49 are adapted to be engaged by the finger 40 to hold the frame 32 in position and act as guide bearings for the finger 40 during reciprocation of the front frame 32, Fig. 10. The roller 49 is revolubly mounted on a fixed shaft mounted in a supporting bearing which is pivoted to a lug rigid with the plate 43. A spring 50 is connected to the lug and to the shaft on which the roller 49 is mounted to urge movably the roller 49 toward the roller 47, there being means to limit urging movement of the roller 49.

Rollers 51 and 52 are arranged on opposite sides of the aligned holes in the plate 43 and bar 42, through which aligned holes or openings the finger 39 on the rear frame 28 passes during reciprocation of the frame 28. These rollers 51 and 52 are adapted to be engaged by the finger 39 to hold the frame 28 in position and act as guide bearings for the finger 39 during reciprocation of the rear frame 28, Fig. 10.

The roller 51 is revolubly mounted on a fixed shaft mounted in a supporting bearing which is pivoted to a lug rigid with the plate 43. The roller 52 is revolubly mounted on a fixed shaft which is mounted in a fixed boss on the plate 43. A spring 53 is connected to the fixed boss and to the shaft on which the roller 51 is mounted to urge movably the roller 51 toward the roller 52, there being means to limit the urging movement of the roller 51.

The shiftable shaft 44 may be slid from its normal operable position shown in Figs. 9 and 10 to an inoperative position (toward the right, Fig. 10) whereby the roller 47 will be away from the finger 40 on the front frame 32. The positioning of the roller 47 away from the finger 40 permits the outer frame 32 to swing outwardly, away from the inner frame 28, the outer frame 32 swinging about the shaft 30 as its pivot. It is, therefore, an easy matter to make repairs, changes or replacements to both frames 28 and 32 as the frame 32 will be away from the frame 28, permitting easy access to the inner frame 28 as well as to the outer frame 32.

The rollers 49 and 51 are provided with inward yieldable movement because the action of the rockers in reciprocating the knife frames has a somewhat angular or oscillatory movement, particularly at the lower end. Any such oscillatory movement at the upper end of the knife frame will be compensated for by the yielding of the rollers 49 and 51. The rollers 47, 49, 51 and 52 guide the fingers on the inner side and still permit for any oscillatory movement.

The frames 28 and 32 are reciprocated by rockers 17 and 22, the frame 28 being reciprocated by the arms 18 and 23 of the rockers 17 and 22, and the frame 32 being reciprocated by the arms 19 and 24 of said rockers 17 and 22. The arms 18 and 23 are rocked in an upward direction as the arms 19 and 24 are rocked in a downward direction; therefore, the frame 28 will travel upwardly while the frame 32 will travel downwardly. The frames 28 and 32 reciprocate synchronously at the same time but in opposite directions.

The frames 28 and 32 (Figure 4) each carry spaced apart cutting knives 54 which face in the same direction (inwardly) so as to cut the substance 55 (bread). The knife spacing on the frames is such that the knives on one frame split or divide the space between the knives of the other frame. For example, should one-half inch slices be required, the knife spacing of each frame would be one inch, but, inasmuch as the knives of one frame are between the knives of the other frame, the adjacent spacing of the knives will be one-half inch. Alternate knives reciprocate in opposite directions because as one frame moves upwardly, the other frame will move downwardly. Thus, there is alternate reciprocation of the frames 28 and 32 causing alternate reciprocation of adjacent cutting knives 54.

The bottom bars of the frames 28 and 32 have rigid fingers or projections 56 (Fig. 3) extending inwardly towards each other with laterally projecting pins 57 to fit into the lower of the holes 58 at the end of the knives 54. The holes 58 at the upper ends of the knives 54 are held by pins 59 projecting from levers 60 removably mounted in the top bars 35 of the frames 28 and 32, Fig. 5. The levers 60 are supported by the top bars 35 by means of slots formed in the opposed side walls of the top bars 35, being held in place by notches 61 in the levers, engaging the metal surrounding the lower slots on one side of the top bars and being supported further by extending through slots 62 at the upper outer ends of the top bars 35.

The extreme outer ends of the levers 60 terminate in bifurcated ends 63 which receive pins on depressible handle levers 64, whereby the levers 64 are pivotally supported by the said bifurcated ends 63, Fig. 5. Coil springs 65 are secured to the depressible levers 64 and to lower parts projecting outwardly from the outer faces of the top bars 35. The attachment of the springs 65 to the depressible levers 64 are spaced a predetermined distance from the pivot support of the levers 64 with the bifurcated ends 63 whereby tension may be had on the knives 54 when the levers 64 are in their normal operating position as shown in Fig. 5. The levers 64, when in their normal operating position as shown in Fig. 5, are prevented from rotating in a clockwise direction by abutting against the coil springs 62. The knives 54 may be removed easily by raising the depressible levers 64, whereby tension on the springs 65 is released. It is, therefore, an easy and simple operation to remove and apply knives readily and easily and without the use of tools. Furthermore, a sufficient and proper spring tension is applied to the knives 54 when the handle levers 64 are depressed to normal operable position as shown in Fig. 5.

The support for the substance 55 comprises a substance chute 66 (Figs. 3, 4 and 15) which includes a plate 67 acting as a tie rod secured to the side walls 2 and 3, and a removable plate or section 68, the tops of the plates 67 and 68 being flush and smooth. The removable plate 68 is supported on lugs 69 on the side walls and has openings 70 at its ends to receive upstanding knobs 71 on the lugs 69. Locking members 72 are pivotally mounted at the sides of the removable plate 68 near the side edges thereof and have notches 73 formed on their sides near their ends to slip over the knobs 71. The bases of the members 72 thicken progressively so as to insure the locking members being held tightly and to prevent rattling. No screws or bolts need be removed to remove the plate 68. The sides of the members 72, when in locked or operative position, incline or converge inwardly, thus acting as guides for the substance 55 to insure its proper position with respect to the cutting knives. The outer end of the plate 68 extends beyond the knives, there being spaced slots 74 forming spaced fingers between which the knives pass. The loaf of bread 55 is, therefore, properly supported throughout the entire feeding and slicing operation from the time the loaf is first inserted until after it is cut or sliced.

A slice receiving tray 75 is removably mounted at the front of the machine to receive the sliced loaf after it has passed through the machine. This tray has an angle bar 76, Fig. 4, secured to its bottom at the inner end thereof. The bar is adapted to be received in slots formed in lugs secured to the side walls 2 and 3, the leg of the bar being received in the notched lugs to support and position the tray 75. The inner end of the tray 75 is adapted to extend beneath the spaced fingers on the end of the plate, and as the tray is moved downwardly to bring the spring latch 77 into locking registration with the front tie rod or strap 5, the inner end of the tray will press against the underside of the fingers at the inner end of the plate 68 and yieldingly press the tray 75 and plate 68 together and prevent any rattling of the parts.

A manually operated weighted substance pusher 78, Figs. 4 and 11, has side arms 79 which are pivotally mounted at 80 to the frame side walls 2 and 3. This pusher 78 includes a cross bar 81 to which a member 82 may be detachably and removably secured. The member 82 is made integral and includes spaced fins 83, the fins being spaced to permit passage through the knives. The fin spacing is such as to accommodate the knives as the pusher pushes the substance 55 through the knives 54 and the sliced substance onto the slice receiving tray 75. The pusher member 82 is deeper at the top than at the bottom so as to tend to hold the bread 55 in position and prevent it from moving up and down during the slicing operation.

One arm 79, Figs. 11 to 13, of the pusher 78, has a spring pressed pin 84 slidable therein, which pin is held in a predetermined position by a spring 85. This pin is adapted to control or operate linkage 86 for starting the machine and for stopping the machine after the slicing operation is completed. This linkage 86 includes a part 87 which is pivoted to a side wall, as indicated at 88, an upper integral portion 89, and a lower integral portion 90 with which the pin 84 has cooperation. A knob 91 on the part 90 has cooperation with the part 87. A long curved link 92 has a slot and pin connection with the part 90, as indicated at 93, the link 92 being pivoted to a side wall as indicated at 94. The end of this link 92 is pivotally connected by a slot and pin connection to a pivotally mounted plate 95 upon which there is carried a mercury switch electrically connected to a motor circuit whereby the motor 6 is started or stopped by the link 92.

The pin 84 strikes the top of the arm 89 and pushes the part 89 downwardly to pull the far end of the link 92 down to move the mercury switch to start the motor. A pin 96 on the arm 79, as the pusher moves downwardly, strikes the long curved link 92 at the point indicated at 97. The extreme end 98 of member 89 has a cam surface to permit the pin 84 to slide back over the top of the arm 89 when the pusher is raised.

In operation a loaf 55 is inserted in place with the pusher in raised position, the pusher being held by a latch 99 (Figs. 3 and 5) cooperating with a pin 100 on the side frame, the pusher being previously raised by hand by lifting the handle 101. The latch 99 is then released by hand, whereupon the pusher 78 will move in a downward arc by gravity and engage a loaf 55. The downward arcuate movement of the pusher 78 causes the spring pressed or flexible pin 84 to engage the end of the link part 89, swinging that end downwardly and shifting the long link 92 on its pivot 94 to swing the mercury switch plate 95 and start the motor, Figs. 4 and 11 to 13.

At the end of the downward arcuate movement of the pusher, the rigid pin 96 will engage the link 92, pushing that link downward and shifting the mercury switch bracket to inoperative position and shutting off the motor. The pusher is then again raised by hand but the linkage will not be disturbed by the flexible pin 84 because the spring pressed loosely mounted pin 84 will ride over the cam end by depressing the spring 85. Continued upward movement of the pusher permits the spring 85 to push the pin 84 in an outward position after riding over the cam whereupon the pin 84 will again be projected outwardly and be in the path of the cam end of the linkage part 89 so that when the pusher again moves down the pin 84 will again strike the linkage part 89 to shift the main link 92 and again set the motor in operation to drive the rockers 17 and 22 and cause reciprocation of the knife frames 28 and 32, Figs. 11 to 13.

A slice supporting tray 102, Figs. 16 to 18, may be substituted for the slice receiving tray 75. This tray 102 is provided with an angle bar 103 which corresponds to the angle bar 76 secured to the bottom of the tray 75. This angle bar 103, like the angle 76 on the tray 75, is adapted to be received in the notches in the lugs for securing the forward end of the tray 102 in position. The forward end 104 of the tray 102 is adapted to be slid beneath the slotted end of the plate 68 and engage the underside of the substance supporting plate 68, in the same manner in which the tray 75 engages the underside of the plate 68. This tray 102 also is provided with a latching part or detent 77 (Fig. 4), which is adapted to be secured to the cross bar 5 in the same manner in which the tray 75 is locked in position to the said bar 5.

The slice supporting tray 102 may be provided with spaced longitudinal slots 105 to permit crumbs to pass therethrough. The forward end 104 of the slice supporting tray 102 is provided with an elongated slot 106 to permit a bag to be inserted over the remaining portion so that slices may be slid from the slice supporting tray 102 into a bag. The extreme front end of the slice supporting tray 102 is provided with a plurality of spaced rods 107 which extend transversely across the tray. The space between the upper two rods 107, Figs. 16 to 18, is relatively wide so as to receive therebetween a slide bearing 108. This slide bearing has pivotally mounted thereto an arm 109 which carries a vertically disposed plate 110, the arm 109 being pivoted to the bearing 108 as indicated at 111, whereby the plate 110 may be swung on its pivot 111. The plate 110 is adapted to assist in supporting slices as they are cut. As the slices are inserted in a bag, the manual pressure exerted upon the loaf of cut slices will depress the plate 110, that is, swing the plate on its pivot 111 providing a relatively flush surface over which the slices may be slid. The bearing 108, Figs. 16 to 18, is provided with upper and lower bearing surfaces 112 which receive the two upper spaced rods 107 so as to permit free slidable movement of the bearing along the upper surface of the tray. The rods 107 are only secured at their ends whereby there is sufficient flexibility between their ends, particularly near the center thereof, to permit the rods to be sprung apart so as to release the bearing 108. The bearing 108 may, therefore, be turned, as indicated in Fig. 16, so that slices may be inserted in the bag from left to right instead of from right to left, if desired.

A crumb tray 113 in the form of a drawer is slidably mounted at the extreme forward end of the machine so as to collect the crumbs resulting from the loaf being sliced, there being a knob 114 on the drawer for manually operating the same. This drawer is provided with upper flange ends 115, Fig. 3, which are adapted to be supported on a guideway 116. The crumb tray or drawer 113 is adapted to be inserted in a raised position so as to fit into the slots or guideways 116 so that when the crumb tray or drawer 113 is slid into its full position, it will be in normal horizontal position and have a relatively tight fit with the guideways 116 and thereby prevent rattling. A rear plate or cover 117 is removably mounted on the machine between the side walls 2 and 3. The cover is provided with locating pins which are received in holes provided in bosses formed on the side frame. The rear cover is also provided with spring snap fasteners at its lower end to lock the rear cover in place.

The front cover 118 is also adapted to be mounted between the spaced side walls 2 and 3 and this front cover, like the rear cover 117, is provided with pins which fit into holes provided in bosses on the side walls 2 and 3. These holes receive the pins and lock the cover 118 in place. The front cover 118 also is provided with spring catches or snaps which fit or snap over lugs formed on the interior surfaces of the side walls 2 and 3 for locking the front cover securely in place. The locking of the cover 118 to the sides 2 and 3 includes the lugs 119 on the walls and engages parts 120 on the cover 118 as clearly shown in Figs. 3 to 5.

The invention provides a bread slicer which is adapted to have certain parts thereof for repair purposes, cleaning, etc., renewed and applied without the necessity of using tools. Certain parts of the machine are so constructed to engage other parts to prevent rattling. Also, the frames are constructed and arranged so as to be maintained in proper parallelism and to permit for a slight oscillatory movement at the upper end of the knife frames. The outer knife frame is adapted to be removably disconnected from its upper guide and then swung outwardly on its pivot whereby easy access may be had to either knife frame for removing, changing or replacing knives. The weighted pusher is adapted to control mechanism for starting and stopping the motor. Also, the pusher is adapted to engage a loaf and feed it to the machine as well as to assure cut slices being passed completely through the knives. The cut slices are adapted to be received on a receiving tray and the entire sliced loaf slid into a bag which is held in open position by the novel slice receiving tray. The parts are constructed and arranged so that the device may be economically manufactured. The parts are easily and readily attached and detached, including the knives, and the construction of the parts is rigid and durable, thereby effecting long life and attaining the utmost in efficiency.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A slicing machine comprising a supporting structure, a pair of knife frames each pivotally mounted at one end, each frame having a finger on the end opposite the first said end, each finger passing through openings in a part of the structure, a pair of guide rollers adapted to be rotatably engaged by each finger, one of said rollers of each pair movable, and spring means to urge the movable roller of each pair toward the other roller of the same pair.

2. A slicing machine comprising a supporting structure, a pair of knife frames each pivotally mounted at one end, each frame having a finger on the end opposite the first said end, each finger passing through openings in a part of the structure, a pair of guide rollers adapted to be rotatably engaged by each finger, one of said rollers of each pair being movable, and means for retractably mounting one of the rollers of one of said pairs to permit one frame to be swung away from the other frame when said last named roller is in retracted position.

3. A slicing machine comprising a supporting structure, a pair of crank arms operatively supported by said structure, shafts carried by said crank arms, knife frames pivotally connected to said shafts respectively to reciprocate said frames simultaneously in opposite directions, a guide finger on each frame, a pair of guide rollers for each frame and between which a finger is received, and means for retractably mounting one roller of one pair thereby to release a finger when retracted whereby one frame may be swung away from the other frame.

4. A cutter blade assembly for slicing machines, embodying a reciprocable blade carrying frame including spaced head pieces, a cutter blade spanning the space between said heads, means removably securing the ends of said blade to said head pieces, means connected with one end of the frame for reciprocating it, a finger at the opposite end of the frame, guiding rollers between which said finger operates at one end of the frame, and means mounting one of said rollers for bodily adjustment away from the other roller, to permit removal of said frame.

5. A slicing machine comprising a pair of knife frames having spaced bars and mounted for reciprocation, means to reciprocate said frames simultaneously in opposite directions, pins projecting from one bar of each frame, knives having spaced end apertures and secured to said pins at one end, levers fulcrumed on the opposite bar of each frame, pins on the levers at one side of the fulcrum to enter apertures on the other ends of the knives, manually operated handle levers pivoted to said first levers at the opposite side of the fulcrum, springs connected at one end to said opposite bar of each frame on the same side of the fulcrum as said handle levers, and connected at the other end to the handle levers at a point beyond the pivot of the handle levers with said first levers, and stop means for limiting the movement of said handle levers in tension position, the point of connection of said springs with said handle levers moving from one side to the other of the pivoted connection between said handle levers and said first levers when said handle levers are moved from tension to release positions.

6. A slicing machine comprising a pair of knife frames having spaced bars and mounted for reciprocation, means to reciprocate said frames simultaneously in opposite directions, pins projecting from one bar of each frame, knives having spaced end apertures and secured to said pins at one end, levers fulcrumed on the opposite bar of each frame, pins on the levers at one side of the fulcrum to enter apertures on the other ends of the knives, manually operated handle levers pivoted to said first levers at the opposite side of the fulcrum, coiled tension springs connected at one end to said opposite bar of each frame on the same side of the fulcrum as said handle levers, and connected at the other end to the handle levers at a point beyond the pivot of the handle levers with said first levers, and stop means for limiting the movement of said handle levers in tension position, the point of connection of said springs with said handle levers moving from one side to the other of the pivoted connection between said handle levers and said first levers when said handle levers are moved from tension to release positions.

7. A slicing machine comprising a pair of knife frames having spaced bars and mounted for reciprocation, means to reciprocate said frames simultaneously in opposite directions, pins projecting from one bar of each frame, knives having spaced end apertures and secured to said pins at one end, levers fulcrumed on the opposite bar of each frame, pins on the levers at one side of the fulcrum to enter apertures on the other ends of the knives, manually operated handle levers pivoted to said first levers at the opposite side of the fulcrum, yieldable means connected at one end to said opposite bar of each frame on the same side of the fulcrum as said handle levers, and connected at the other end to the handle levers at a point beyond the pivot of the handle levers with said first levers, and stop means for limiting the movement of said handle levers in tension position, the point of connection of said yieldable means with said handle levers moving from one side to the other of the pivoted connection between said handle levers and said first levers when said handle levers are moved from tension to release positions.

8. A slicing machine comprising a pair of knife frames having spaced bars and mounted for reciprocation, means to reciprocate said frames simultaneously in opposite directions, pins projecting from one bar of each frame, knives having spaced end apertures and secured to said pins at one end, generally L-shaped levers fulcrumed adjacent one end thereof on the opposite bar of each frame, pins on the fulcrumed end of said levers at one side of the fulcrum to enter apertures on the other ends of the knives, manually operated handle levers pivoted to said L-shaped levers adjacent the other ends thereof and at the opposite sides of the fulcrum, guide means for guiding the movement of said L-shaped levers about their fulcrums, yieldable means connected at one end to said opposite bar of each frame on the same side of the fulcrum as said handle levers, and connected at the other end to the handle levers at a point beyond the pivot of the handle levers with said first levers, and stop means for limiting the movement of said handle levers in tension position, the point of connection of said yieldable means with said handle levers moving from one side to the other of the pivoted connection between said handle levers and said L-shaped levers when said handle levers are moved from tension to release positions.

9. A slicing machine comprising a pair of knife frames having spaced bars and mounted for reciprocation, means to reciprocate said frames simultaneously in opposite directions, pins projecting from one bar of each frame, knives having spaced end apertures and secured to said pins at one end, generally L-shaped levers fulcrumed adjacent one end thereof on the opposite bar of each frame, pins on the fulcrumed end of said levers at one side of the fulcrum to enter apertures on the other ends of the knives, manually operated handle levers pivoted to said L-shaped levers adjacent the other ends thereof and at the opposite side of the fulcrum, guide slots in each of said opposite bars removed from said fulcrum for guiding the movement of said L-shaped levers about their fulcrum, yieldable means connected at one end to said opposite bar of each frame on the same side of the fulcrum as said handle levers, and connected at the other end to the handle levers at a point beyond the pivot of the handle levers with said first levers, and stop means for limiting the movement of said handle levers in tension position, the point of connection of said yieldable means with said handle levers moving from one side to the other of the pivoted connection between said handle levers and said L-shaped levers when said handle levers are moved from tension to release positions.

10. A cutter blade assembly for slicing machines embodying a reciprocable blade carrying frame including spaced head pieces, a cutter blade spanning the space between said heads, means removably securing the ends of said blade to said head pieces, one of said means embodying a lever fulcrumed on the head piece, a pin on said lever at one side of the fulcrum to enter an aperture in one end of said blade, a manually operated handle lever pivoted to said first lever at the opposite side of the fulcrum, yieldable means connected at one end to the headpiece on the same side of the fulcrum as said handle lever, and connected at the other end to the handle lever at a point beyond the pivot of the handle lever with said first lever, and stop means for limiting the movement of said handle lever in tension position, the point of connection of said yieldable means with said handle lever moving from one side to the other of the pivoted connection between said handle lever and said first lever when said handle lever is moved from tension to release positions.

MORRIS BRUSTOWSKY.

REFERENCES CITED

The following references are of record in the file of this patent:

UNITED STATES PATENTS

| Number | Name | Date |
| --- | --- | --- |
| 1,412,026 | Sturtevant | Apr. 4, 1922 |
| 1,711,208 | Rilling | Apr. 30, 1929 |
| 1,977,071 | Littlefield | Oct. 16, 1934 |
| 2,011,043 | Ferenci | Aug. 13, 1935 |
| 2,018,121 | Criner | Oct. 22, 1935 |
| 2,024,157 | Fritz | Dec. 17, 1935 |
| 2,033,700 | Geiger | Mar. 10, 1936 |
| 2,036,403 | Friesel et al. | Apr. 7, 1936 |
| 2,037,362 | Beauclerk | Apr. 14, 1936 |
| 2,062,847 | Vollmer | Dec. 1, 1936 |
| 2,101,002 | Fincke | Nov. 30, 1937 |
| 2,147,322 | Tuthill | Feb. 14, 1939 |
| 2,160,387 | Lyon | May 30, 1939 |
| 2,217,812 | Petskeyes | Oct. 15, 1940 |
| 2,242,935 | Ahrndt | May 20, 1941 |
| 2,280,059 | Brustowsky | Apr. 21, 1942 |

FOREIGN PATENTS

| Number | Country | Date |
| --- | --- | --- |
| 652,156 | Germany | Oct. 26, 1937 |